United States Patent
Busking

(10) Patent No.: US 6,442,382 B1
(45) Date of Patent: Aug. 27, 2002

(54) FILTER SWITCHING SYSTEM AND METHOD

(75) Inventor: Erik Busking, Den Haag (NL)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 08/884,155

(22) Filed: Jun. 27, 1997

(51) Int. Cl.⁷ .................................. H04B 1/06
(52) U.S. Cl. .................. 455/266; 455/339; 455/314
(58) Field of Search .................. 455/266, 339, 455/340, 314, 295, 180.1, 188.1, 189.1, 132, 133, 134, 135, 140, 141, 150.1, 84, 86, 137, 277.1

(56) References Cited

U.S. PATENT DOCUMENTS

| | | | | |
|---|---|---|---|---|
| 4,158,308 A | * | 6/1979 | Sharpe et al. .................. 73/609 |
| 4,262,361 A | * | 4/1981 | Hauer ..................... 455/266 X |
| 4,429,279 A | * | 1/1984 | Wycoff et al. ............... 455/266 |
| 4,563,651 A | * | 1/1986 | Ohata et al. ................. 455/266 |
| 4,596,045 A | * | 6/1986 | Maier ..................... 455/133 X |
| 5,239,697 A | * | 8/1993 | Kosuga ..................... 455/133 |
| 5,280,636 A | * | 1/1994 | Kelley et al. ........ 455/180.1 X |
| 5,287,556 A | * | 2/1994 | Cahill ........................ 455/266 |
| 5,465,410 A | * | 11/1995 | Hiben et al. ................ 455/266 |
| 5,483,209 A | * | 1/1996 | Takayama ................ 455/188.1 |
| 5,499,394 A | * | 3/1996 | Kaatz et al. ................. 455/266 |
| 5,564,094 A | * | 10/1996 | Anderson et al. ........... 455/295 |
| 5,630,213 A | * | 5/1997 | Vannatta ..................... 455/133 |
| 5,640,694 A | * | 6/1997 | Milton, Jr. .................. 455/266 |
| 5,708,399 A | * | 1/1998 | Fujii et al. .................. 455/333 |
| 5,732,330 A | * | 3/1998 | Anderson et al. ............. 455/76 |
| 5,758,266 A | * | 5/1998 | Kornfeld et al. ............. 455/86 |
| 5,867,771 A | * | 2/1999 | Ruitenburg .................. 455/86 |

OTHER PUBLICATIONS

Martin Hasler, Jacques Neirynck, "Electric Filters", 1/97.
"Double Balanced Mixer and Oscillator," NE612, Nov. 3, 1987.
"Transistor Array," NEC, May 13, 1993.

* cited by examiner

Primary Examiner—Edward F. Urban
Assistant Examiner—Charles Craver

(57) ABSTRACT

A communication system with variable filter bandwidth includes a first mixer circuit configured to receive a communication signal and shift the frequency range of the communication signal to a first frequency range. A second mixer circuit is configured to receive the same communication signal and shift the frequency range of the communication signal to a second frequency range. An activation circuit is coupled to the first and second mixer circuits so as to provide an activation signal that activates at least one of the mixer circuits. A plurality of filter circuits are provided such that each filter circuit is configured to receive a signal from a corresponding mixer circuit, when said corresponding mixer circuit is activated.

9 Claims, 3 Drawing Sheets

FILTER SWITCHING SYSTEM AND METHOD

FIELD OF THE INVENTION

This invention relates to communication systems and more specifically to communication transmitters and receivers which are capable of switching their channel frequency bandwidth.

BACKGROUND OF THE INVENTION

In many communication applications it is desirable to employ radio receivers and transmitters which utilize variable filter bandwidths. For example, indoor wireless telephones and wireless local area networks WLANs, require such variable filter bandwidths.

Typically, systems that employ variable filter bandwidths are designed to include a plurality of filters with different frequency characteristics. One filter or a group of filters are then electronically selected to process a communication signal by employing one or more switches that route the signal to the appropriate set of filters.

As will be explained in more detail in reference with FIG. 1, such filter switching arrangement may be implemented, for example, in frequency multiplication stage of a transmitter or a receiver system. Typically, a mixer is employed to shift the frequency range of an incoming signal. In the case of a receiver, the mixer is used to shift down a high frequency signal to a lower frequency range. A switch is configured to receive the output signal from the mixer and route this output signal to an appropriate filter.

Such filter switching arrangement may also be implemented, for example, in a signal amplification stage. Typically, two or more filters with different frequency characteristics are configured to receive an amplified voltage signal via a switch.

One disadvantage with this switching configuration is that the use of switches in combination with mixers or amplifiers introduces signal distortions that leads to higher error rates. Furthermore, the termination impedances of each filter require to be substantially the same and match with the termination impedance of the mixer or amplifier output stage. However, it is sometimes difficult to design filters with different frequency bandwidths that exhibit substantially the same termination impedance.

Thus, there is a need for a communication system that employs variable filter bandwidths and has substantially no distortion due to the use of switches for routing signals to various filters.

SUMMARY OF THE INVENTION

In accordance with an exemplary embodiment of the present invention, a communication system with variable filter bandwidth comprises a first mixer circuit configured to receive a communication signal and shift the frequency range of the communication signal to a first frequency range; a second mixer circuit configured to receive the communication signal and shift the frequency range of the communication signal to a second frequency range; an activation signal coupled to the first and second mixer circuit so as to activate one of the mixer circuits; a plurality of filter circuits each configured to receive a signal from a corresponding mixer circuit, when the corresponding mixer circuit is activated.

In accordance with another exemplary embodiment of the present invention, a communication system with variable filter bandwidth comprises a plurality of Gilbert cells configured to receive a communication signal and a multiplying signal; a plurality of filters having a prespecified bandwidth such that each of the filters is configured to receive a signal from a corresponding Gilbert cell. Furthermore, each Gilbert cell is configured to go to an active state when it receives an activation signal.

DETAILED DESCRIPTION OF THE INVENTION

Figure 1:
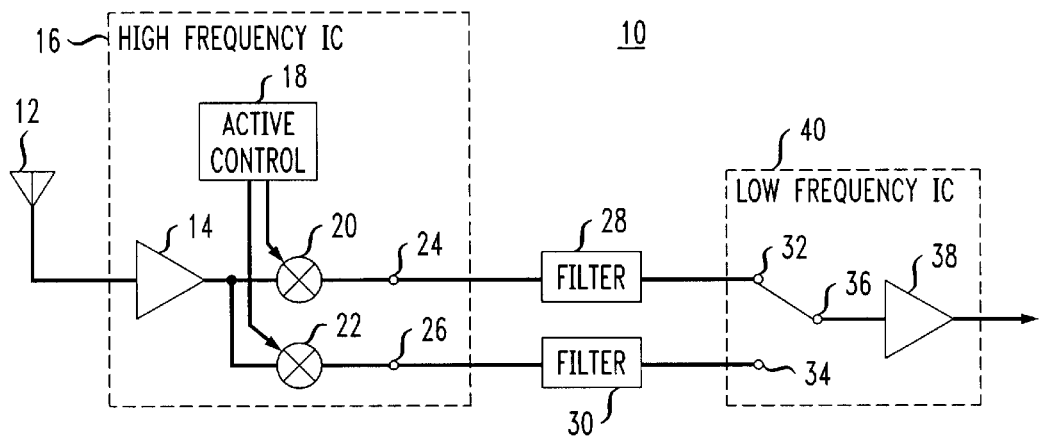
FIG. 1 illustrates a block diagram of a communication system with variable filter bandwidth in accordance with one embodiment of the present invention.

FIG. 1 is a block diagram of a communication system 10 with variable filter bandwidth in accordance with an exemplary embodiment of the present invention, although the invention is not limited in scope in that respect. Communication system 10 may be a receiver that is configured to receive frequency signals via antenna 12. The output port of antenna 12 is coupled to an input port of a high frequency mixer stage 16.

High frequency mixer stage 16 includes an amplifier 14 configured to receive the voltage signal provided by antenna 12. The output port of amplifier 14 is coupled to a plurality of mixer circuits, such as 20 and 22 respectively. An active control circuit 18 provides activation signals via its output ports to mixer circuits 20 and 22. Each activated mixer circuit receives a communication signal via antenna 12 and multiplies that signal by a signal generated via a local oscillator (not shown).

The output port of each mixer circuit, such as 24 and 26 is coupled to a corresponding filter circuit such as 28 and 30. Each filter circuit is configured to provide a different prespecified bandpass frequency range. The output port of each filter circuit is coupled to an input port of a low frequency stage 40 of communication system 10, such as ports 32 and 34.

Low frequency stage 40 includes a switch 36 configured to receive the signal provided by one of the filter circuits such as 28 and 30. The output port of switch 36 is coupled to an input port of an output amplifier 38. The output port of amplifier 38 provides a filtered signal output that may be employed by the remainder circuitry of communication system 10 (not shown).

During operation, active control circuit 18 activates-one of the mixer circuits, such as 20 or 22, depending on the filter that is intended to be used. The activated mixer circuit shifts the frequency range of the received signal via antenna 12 to a prespecified frequency range. The output port of the activated mixer circuit provides a voltage signal to the input port of the filter that is intended to be used. For example, when active control circuit 18 activates mixer circuit 20, the output port of mixer circuit 20 provides a voltage signal to filter 28 via output port 24. Meanwhile, switch 36 is coupled to input port 32 so as to receive the filtered voltage signal provided by filter 28.

It is noted that each of the mixer circuits may be configured to shift the incoming communication signal via antenna 12, to the same frequency range or a different frequency range. This may be accomplished by employing components in the mixer circuit with the same or different characteristics. To this end, a first mixer circuit may provide a first frequency range. A second mixer circuit may provide a second frequency range that is substantially the same as the first frequency range or is different from the first frequency range and so forth.

It is also noted that in accordance with another embodiment of the invention, switch 36 may connect the output ports of filter 28 and 30 to amplifier 38 simultaneously. Because, only the activated mixer provides a voltage signal, the signal path comprising the nonactivated mixer, and the corresponding filter would not carry a voltage signal. Therefore, amplifier 38 receives a voltage signal only from the path that comprises an activated mixer and the corresponding coupled filter. However, this approach may cause cross-interference between permanently connected filters, and may not be desirable in certain applications.

Figure 2:
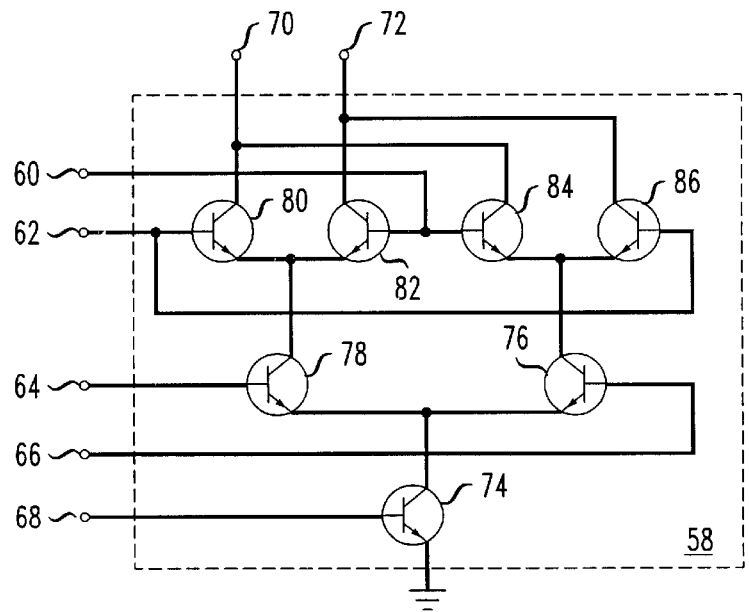
FIG. 2 illustrates a schematic diagram of a prior art mixer circuit typically known as a Gilbert cell.

FIG. 2 is a schematic diagram of a mixer circuit referred to as a Gilbert cell. The operation of Gilbert cells are well-known and described in NEC product specification for *Transistor Array UPA*101*B and UPA*101*G,* and in NEC product specification for 900 *MHZ Silicon MMIC Down Converter UPC*687*G,* and NEC product specification for *Double-Balanced Mixer and Oscillator NE*612 (11/3/1987), all of which are incorporated herein by reference.

As illustrated in FIG. 2, a Gilbert cell 58 includes at least two differential input ports such as 60–62 and 64–66, configured to receive the signals which are intended to be multiplied. For example, ports 60–62 are configured to receive a communication signal received via antenna 12 of FIG. 1, and ports 64–66 are configured to receive a multiplying signal received from the output port of a local oscillator (not shown). Port 68 is configured to receive an activation signal so as to activate the multiplication operation of the Gilbert cell. The resulting signal is provided at a differential output port such as 70–72.

Differential input ports 60–62 provide the communication signal to a couple of differential pair amplifiers comprising of n-p-n bipolar transistors 80–82 and 84–86 respectively. The emitter terminals of transistors 80 and 82 are coupled together. Similarly the emitter terminals of transistors 84 and 86 are coupled together. The base terminal of transistor 80 and 86 are coupled together and to port 62. Similarly, base terminals of transistors 82 and 84 are coupled together and to port 60. The collector terminals of transistors 80 and 84 are coupled together and to port 70. Similarly, the collector terminals of transistors 82 and 86 are coupled together and to port 72.

A differential input pair comprising of transistors 78 and 76 are configured to receive multiplication signal via ports 64 and 66 respectively. The emitter terminal of transistor 78 is coupled to the emitter terminal of transistor 76. The collector terminal of transistor 78 is coupled to the emitter terminals of transistors 80 and 82. Similarly the collector terminal of transistor 76 is coupled to the emitter terminals of transistors 84 and 86. The base terminal of transistor 78 is coupled to port 64. Similarly, the base terminal of transistor 76 is coupled to port 66.

An activating switch defined by transistor 74 is configured to receive an activation signal via port 68 of Gilbert cell 58. The collector terminal of transistor 74 is coupled to the common emitter terminal of transistors 78 and 76 respectively. The collector terminal of transistor 74 is coupled to ground.

During operation, all transistors are appropriately biased. A signal received at ports 60–62 is then multiplied by a signal received at ports 64–66, whenever transistor 74 is "ON." The resultant multiplied signal is provided at ports 70–72.

It is noted that the invention is not limited in scope to bipolar transistors employed in the exemplary Gilbert cell illustrated in FIG. 2 and other types of transistors such as MOSFETs or FETs may be employed in accordance with other embodiments of the invention.

Figure 3:
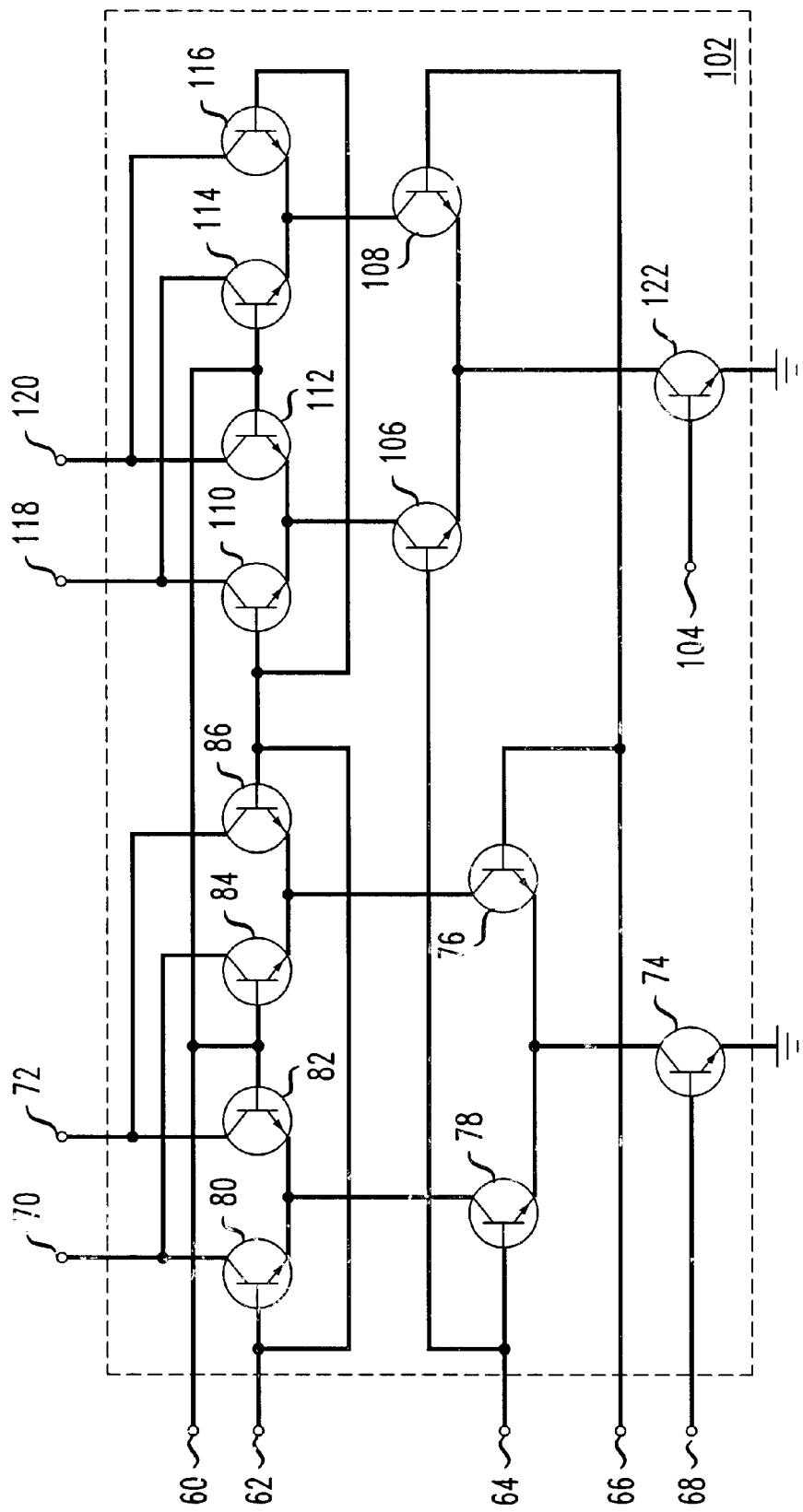
FIG. 3 illustrates a schematic diagram of a mixer cell employed in a communication system with variable filter bandwidth in accordance with one embodiment of the present invention.

FIG. 3 illustrates a schematic diagram of a multiple Gilbert cell in accordance with an exemplary embodiment of the present invention. As illustrated in FIG. 3 a first Gilbert cell as described in FIG. 2 is employed to receive signals at ports 60–62 and 64–66 respectively, and to provide a multiplied signal at output ports 70–72. A second Gilbert cell is coupled to the first Gilbert cell. Thus, a couple of differential pairs comprising of transistors 110–112 and 114–116 are configured to receive a voltage signal via ports 60–62. The base terminal of transistor 86 is coupled to the base terminal of transistor 110 and transistor 116. Similarly, the base terminal of transistor 112 is coupled to the base terminal of transistor 114 and to the base terminals of transistors 84 and 82. The emitter terminals of transistors 110 and 112 are coupled together, and, the emitter terminals of transistors 114 and 116 are coupled together. The collector terminals of transistors 110 and 114 are coupled to an output port 118. The collector terminals of transistors 112 and 116 are coupled to an output port 120.

The base terminal of transistor 106 is coupled to the base terminal of transistor 78 and to input port 64. Similarly, the base terminal of transistor 108 is coupled to the base terminal of transistor 76 and to input port 66. The collector terminal of transistor 106 is coupled to the collector terminal of transistors 110 and 112. Similarly, the collector terminal of transistor 108 is coupled to the emitter terminal of transistors 114 and 116.

The emitter terminal of transistors 106 and 108 are coupled together and to the collector terminal of an activating switch defined by transistor 122. The base terminal of transistor 122 is coupled to receive an activation signal via port 104.

During operation, each cell in the multiple Gilbert cell 102 may be activated, while the rest are deactivated. For example, when transistor 74 is "ON," and transistor 122 is "OFF," output ports 70–72 provide a multiplied signal resulting from the multiplication of signals received at ports 60–62 and 64–66. When transistor 122 is "ON," and transistor 74 is "OFF," output ports 118–120 provide a multiplied signal resulting from the multiplication of signals received at ports 60–62 and 64–66 respectively.

Output ports 70–72, in accordance with one embodiment of the present invention, may be coupled to a filter, such as 28 of FIG. 1. Similarly, output ports 118 and 120 may be coupled to a second filter, such as 30 of FIG. 1, which has different frequency characteristics than filter 28. Whenever, it is desired to filter the incoming signal via filter 28, for example, an activation signal is provided via port 68 so as to activate the corresponding first Gilbert circuit, and a deactivation signal is provided via port 104 so as to deactivate the corresponding second Gilbert circuit in multiple Gilbert circuit 102. Furthermore, whenever it is desired to filter the incoming signal via filter 30, for example, an activation signal is provided via port 104 so as to activate the corresponding second Gilbert circuit, and a deactivation signal is provided via port 68 so as to deactivate the corresponding first Gilbert circuit.

It is noted that the termination impedance of each of the Gilbert cells employed in a multiple Gilbert cell, such as 102 may be configured so that it matches the input impedance of the corresponding filter configured to receive a signal from a Gilbert cell. In accordance with this optimal matching arrangement, the distortion rate of signals traveling through a Gilbert cell and its corresponding filter circuit reduces substantially.

It is further noted that although FIG. 3 illustrates a multiple Gilbert cell with two individual Gilbert cells, the invention is not limited in scope in that respect. For example, a variable bandwidth system may be employed with a plurality of filters having different frequency characteristics. In that event, a multiple Gilbert cell having the same number of Gilbert cells as the number of filters may be employed. Each Gilbert cell is coupled to a corresponding filter via its output ports.

Figure 4:
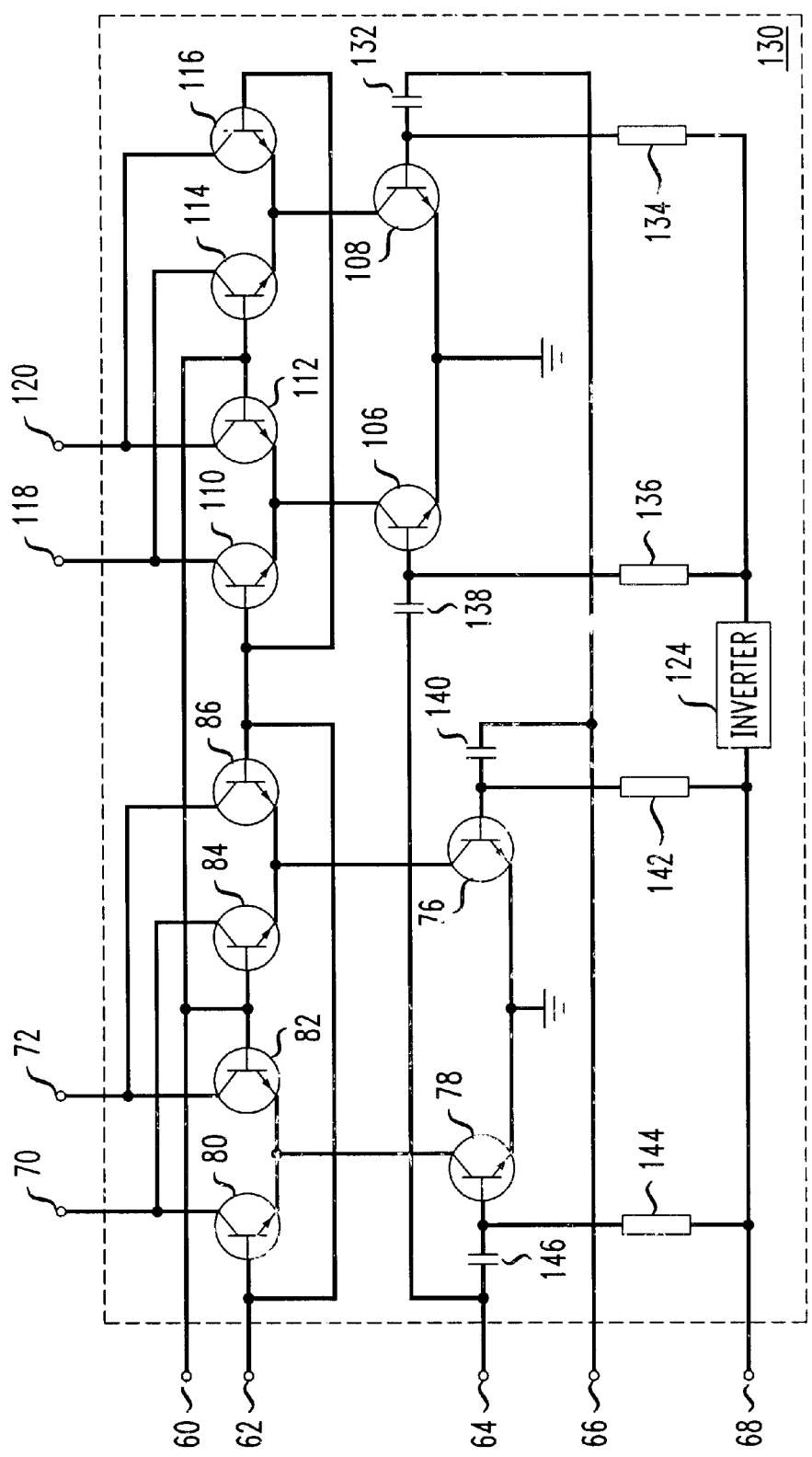
FIG. 4 illustrates a schematic diagram of a mixer cell employed in a communication system with variable filter bandwidth in accordance with another embodiment of the present invention.

FIG. 4 illustrates a schematic diagram of a multiple Gilbert cell 130 employed in a communication system with variable filter bandwidth in accordance with another embodiment of the present invention. As illustrated the first and second mixer circuit in mixer cell 130 are activated by an activation signal received via port 68.

The base terminals of transistors 78 and 106 are coupled to input port 64 via biasing capacitors 146, and 138 respectively, and, the base terminals of transistors 76 and 108 are coupled to input port 66 via biasing capacitors 140 and 132 respectively. The base terminals of transistors 78 and 76 are also coupled to activation port 68 via biasing resistors 144 and 142 respectively. The base terminals of transistors 106 and 108 are coupled to activation port 68 via an inverter 124 and via biasing resistors 136 and 144 respectively. Inverter 124 is configured to provide to the second mixer circuit an inverted version of the signal provided to the first mixer circuit. To this end, when activation signal provided to port 68 is "HIGH," the first mixer circuit is activated and the second mixer circuit is deactivated. Conversely, when the activation signal provided to port 68 is "LOW," the first mixer circuit is deactivated and the second mixer circuit is activated.

It is noted that in accordance with one embodiment of the present invention, the components described herein may be employed in an integrated circuit arrangement.

Thus, in accordance with an exemplary embodiment of the present invention, a multiple Gilbert cell may be utilized to avoid the need of a switch that couples the output of a mixer to one of the plurality of filters. The switching between the outputs of the multiple Gilbert cell is performed by activating one Gilbert cell and deactivating the plurality of the remaining Gilbert cells.

As mentioned before, instead of Gilbert cells, in accordance with another embodiment of the invention, a plurality of active circuits such as signal amplifiers may be configured to provide signals to a corresponding filter that receives the output signal of the active circuit. The plurality of the active circuits receive the same input signal and only the active circuit that is turned "ON," provides an output signal to the corresponding filter. The remaining active circuits that are turned "OFF," provide no output signals to their corresponding filters.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

I claim:

1. A communication system with variable filter bandwidth including a multiple Gilbert cell, comprises:

a plurality of Gilbert cells, wherein each said Gilbert cell is configured to receive a first communication signal and shift the frequency range of said first communication signal to a predetermined frequency range;

each said Gilbert cell having, first input port for receiving said first communication signal, second input port for receiving a multiplier signal and a third input port for receiving an activation signal, where said first input ports are coupled together and where said second input ports are coupled together:

an activation circuit coupled to said plurality of Gilbert cells so as to receive said activation signal so as to selectively activates any one of said Gilbert cells; and a plurality of filter circuits each configured to receive a signal from a corresponding output port of each of said Gilbert cells, when said corresponding Gilbert cell is activated.

2. A communication system in accordance with claim 1 further comprising a selector switch adapted to receive the signal provided by said activated Gilbert cell via said corresponding filter so as to route said received signal to the remaining components of said communication system.

3. A communication system in accordance with claim 1 further comprising a plurality of switching transistors each coupled to a corresponding Gilbert cell so as to receive said activation signal, and in response to which activate said corresponding Gilbert cell.

4. The invention in accordance with claim 1 wherein said filter circuits are bandpass filters.

5. The invention in accordance with claim 4 wherein the frequency characteristics of said bandpass filters are different from each other.

6. The invention in accordance with claim 5, wherein the termination impedance of the output stage of each of said Gilbert cells substantially matches the termination impedance of the input stage of each one of said bandpass filters.

7. The invention in accordance with claim 6 wherein components of said multiple Gilbert cell are employed in an integrated circuit.

8. The invention in accordance with claim 1 wherein each one of said Gilbert cells are employed to multiply a first and a second signal and generate a signal corresponding to the multiplied signals, each Gilbert cell comprising;

a first and a second differential pair transistors configured to receive said first signal intended to be multiplied by said second signal, and further configured to provide the signal corresponding to the multiplied signals;

a third differential pair transistor coupled to said first and second differential pair transistors further configured to receive said second signal intended to be multiplied by said first signal; and a selector switch coupled to said third differential pair transistor and configured to receive said activation signal, such that when said selector switch is turned "ON," said Gilbert cell is activated.

9. The invention in accordance with claim 1 wherein each one of said Gilbert cells are employed to multiply a first and a second signal and generate a signal corresponding to the multiplied signals, each Gilbert cell comprising;

a first and a second differential pair transistors configured to receive said first signal intended to be multiplied by said second signal, and further configured to provide the signal corresponding to the multiplied signals;

a third differential pair transistor coupled to said first and second differential pair transistors further configured to receive said second signal intended to be multiplied by said first signal, wherein said third differential pair transistor receives said activation signal; and an inverter circuit configured to receive said activation signal and provide an inverted version of said activation signal to a second Gilbert cell.

* * * * *